United States Patent [19]
Kobayashi

[11] Patent Number: 5,453,909
[45] Date of Patent: Sep. 26, 1995

[54] ELECTRIC DOUBLE LAYER CAPACITOR

[75] Inventor: Yoshihiro Kobayashi, Tokyo, Japan

[73] Assignee: NEC Corporation, Minato, Japan

[21] Appl. No.: 318,478

[22] Filed: Oct. 5, 1994

[30] Foreign Application Priority Data

Oct. 6, 1993 [JP] Japan .................................. 5-249641

[51] Int. Cl.$^6$ ................................................. H01G 9/155
[52] U.S. Cl. ........................................................ 361/502
[58] Field of Search ........................ 361/502; 29/25.03; 429/247, 254

[56] References Cited

U.S. PATENT DOCUMENTS 3,536,963  10/1970  Boos ...................................... 361/502

FOREIGN PATENT DOCUMENTS

| | | |
|---|---|---|
| 56-70622 | 6/1981 | Japan . |
| 60-171716 | 9/1985 | Japan . |
| 3278512 | 12/1991 | Japan . |
| 4075313 | 3/1992 | Japan . |
| 4240708 | 8/1992 | Japan . |

*Primary Examiner*—Bruce A. Reynolds
*Assistant Examiner*—Michael D. Switzer
*Attorney, Agent, or Firm*—Burns, Doane, Swecker & Mathis

[57] ABSTRACT

An electric double layer capacitor includes a pair of opposing polarized electrodes, a separator, a pair of external electrodes, and an insulating molding case. The pair of opposing polarized electrodes consist of activated carbon. The separator has characteristics which allow the separator to transmit ions but not to transmit electrons, and isolates the polarized electrodes from each other. The separator has an uneven shape for increasing a surface area of the separator. Each of the pair of external electrodes has one terminal electrically connected to a corresponding one of the polarized electrodes. The insulating molding case externally extracts the other terminal of each of the external electrodes to accommodate the polarized electrodes together with an electrolytic solution.

4 Claims, 2 Drawing Sheets

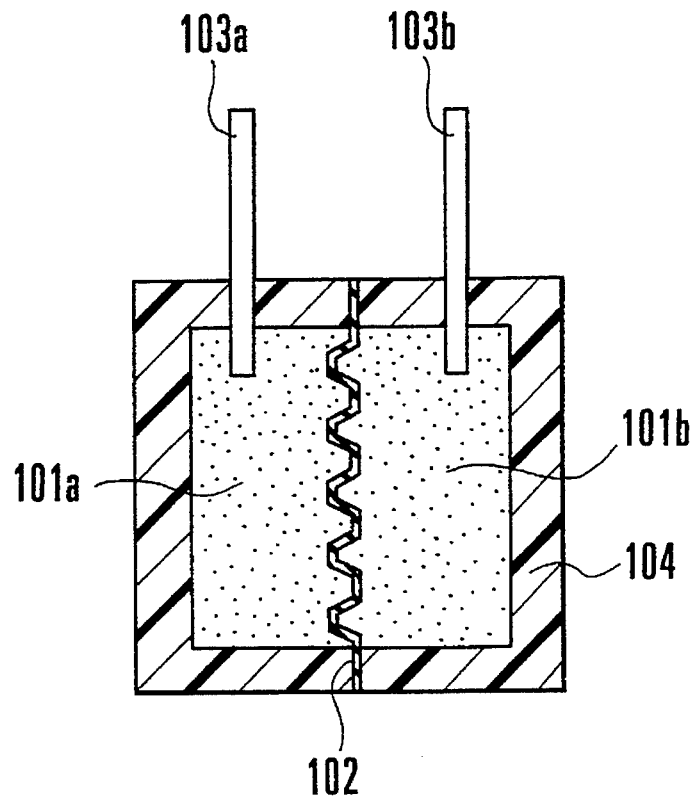
F I G. 1
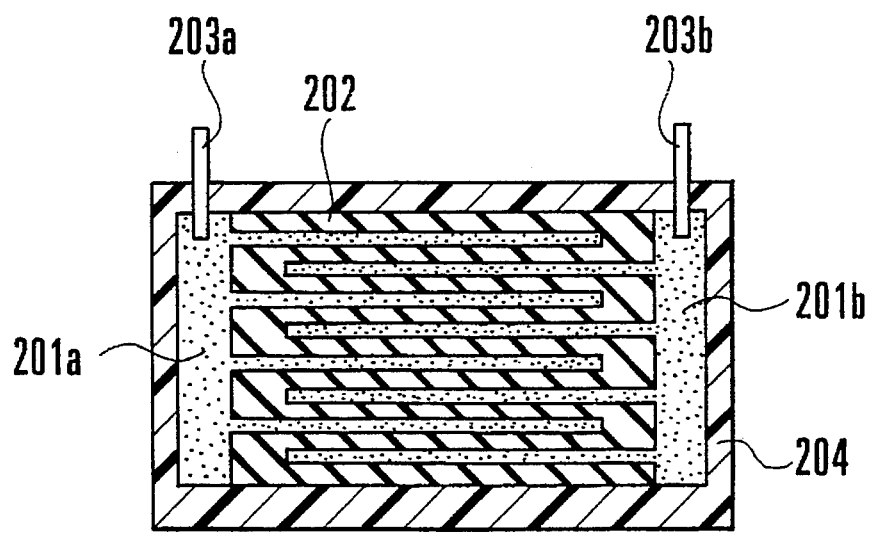
F I G. 2

ELECTRIC DOUBLE LAYER CAPACITOR

BACKGROUND OF THE INVENTION

The present invention relates to an electric double layer capacitor utilized as a rechargeable power supply.

A conventional electric double layer capacitor, as shown in FIG. 3, is constituted by a separator 2 for separating polarized electrodes 1a and 1b, which are formed by soaking activated carbon in a sulfuric acid solution, from each other, external electrodes 3a and 3b for connecting the polarized electrodes 1a and 1b to an external circuit, and a molding case 4 for casing them. The separator 2 consists of an insulating film such as a polyethylene film having fine pores which transmit ions but do not transmit electrons and are formed by an etching process or the like. The external electrodes 3a and 3b are acid resistant conductive electrodes consisting of carbon or the like, and the molding case 4 is an acid resistant plastic case.

In this electric double layer capacitor, when the external electrodes 3a and 3b are respectively connected to the positive and negative terminals of a power supply to charge the capacitor, the activated carbon surfaces of the polarized electrodes 1a and 1b are charged to be positive and negative, respectively. The electric double layer capacitor is a capacitor using an electric double layer formed at the interface between the activated carbon and the sulfuric acid solution serving as an electrolytic solution. Since a material such as activated carbon having a large specific surface of 1,000 $m^2/g$ is used as an electrode, a large capacitance of 20 to 40 $\mu F/cm^2$ can be obtained. As a result, the capacitor which advantageously can obtain a capacitance of 200 to 400 F per gram of activated carbon. The capacitor can be extensively used in various electric circuits as a simple power supply because the capacitor can obtain a large capacitance as described above.

The charging/discharging performance of this capacitor is mainly dependent on the internal resistance thereof, i.e., a capacitor having a lower internal resistance can be quickly charged and discharged by a larger current. In the conventional electric double layer capacitor described above, the internal resistance is dependent on the number of ions which are transmitted through the fine pores of the separator 2. Therefore, although there is a state-of-the-art method of increasing the number of pores of the separator 2 or the diameter of each pore of the separator 2, the internal resistance of the separator 2 having a size of 20 $cm^2$ is about 3 $m\Omega$, and a charging/discharging current of several amperes at most is allowed to flow in the separator 2. In addition, since the breakdown voltage of an electric double layer capacitor using a sulfuric acid solution is theoretically about 1.2 V, a large number of capacitors each shown in FIG. 3 must be connected in series with each other in accordance with a voltage to be used, and a decrease in internal resistance is a very serious problem to be solved.

In this conventional electric double layer capacitor, the magnitude of the internal resistance is dependent on the number of ions which are transmitted through the separator 2, and a required number of capacitor units for obtaining a desired breakdown voltage must be connected in series with each other to assure the breakdown voltage. For example, since the breakdown voltage of a capacitor using a sulfuric acid solution as an electrolytic solution is 1.2 V, five capacitor units must be connected in series with each other in a circuit which requires a 5-V charging/discharging circuit. In this case, since the internal resistance becomes five times that of a circuit using only one capacitor unit, the conventional capacitor unit cannot be used in a circuit having a large charging/discharging current.

SUMMARY OF THE INVENTION

It is an object of the present invention to provide an electric double layer capacitor whose internal resistance is decreased.

It is another object of the present invention to provide an electric double layer capacitor which can be quickly charged/discharged by a large current.

In order to achieve the above objects, according to the present invention, there is provided an electric double layer capacitor comprising a pair of opposing polarized electrodes consisting of activated carbon, a separator, having characteristics which allow the separator to transmit ions but not to transmit electrons, for isolating the polarized electrodes from each other, the separator having an uneven shape for increasing a surface area of the separator, a pair of external electrodes each having one terminal electrically connected to a corresponding one of the polarized electrodes, and an insulating molding case for externally extracting the other terminal of each of the external electrodes to accommodate the polarized electrodes together with an electrolytic solution.

According to the present invention, a separator is processed to have dimples or is complicated with polarized electrodes without changing the size of pores of the separator which transmits ions, thereby increasing the area of the separator. For this reason, when the area of the separator is twice, its internal resistance can be made ½; when the area of the separator is ten times, its internal resistance can be made ¹⁄₁₀. Therefore, a capacitor according to the present invention can be charged and discharged by a large current.

BRIEF DESCRIPTION OF THE DRAWINGS

FIG. 1 is a sectional view showing an electric double layer capacitor according to the first embodiment of the present invention;

FIG. 2 is a sectional view showing an electric double layer capacitor according to the second embodiment of the present invention.

DESCRIPTION OF THE PREFERRED EMBODIMENTS

Figure 3:
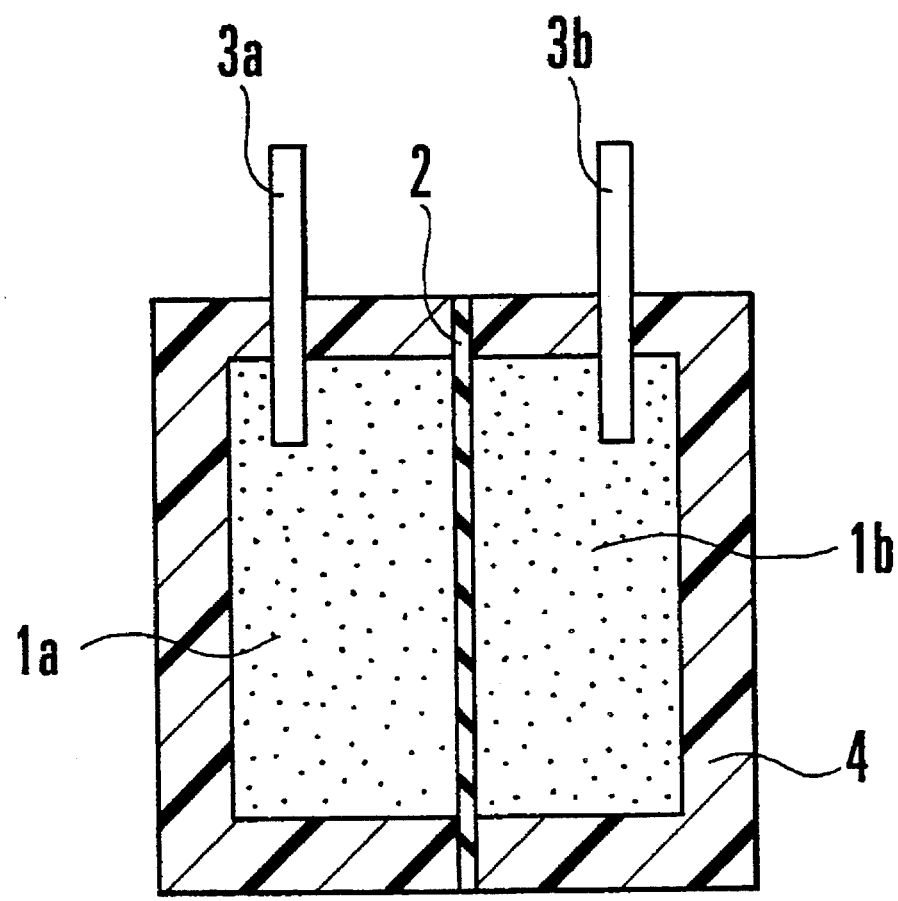
FIG. 3 is a sectional view showing a conventional electric double layer capacitor.

The present invention will be described below with reference to the accompanying drawings. FIG. 1 shows an electric double layer capacitor according to the first embodiment of the present invention. In manufacturing this capacitor, first, an activated carbon powder is pressed at a temperature of about 150° C. for 10 minutes in a mold processed to have dimples, and is sintered at 900° C. to form polarized electrodes 101a and 101b. The polarized electrodes 101a and 101b are partially cut, and are connected to external electrodes 103a and 103b, respectively. A separator 102 consists of a synthetic resin such as polyethylene chemically etched and having a large number of pores which transmit ions but do not transmit electrons. When this separator 102 is cut in the form of a sheet, the separator 102 is transformed by a dimple-shaped uneven portion partially formed in the inner surface of a cutting mold such that the separator 102 has the same shape having a number of dimples as that of the activated carbon powder. In this case, the temperature of the cutting mold is preferably set to be about 100° C.

The separator 102 processed to have the dimples as described above is arranged in a molding case 104 using an epoxy resin or the like. The polarized electrodes 101a and 101b processed to have dimples are inserted into the molding case 104 partitioned by the separator 102 such that the polarized electrodes 101a and 101b are conformed to the dimple shape of the separator 102. A sulfuric acid solution serving as an electrolytic solution is injected into the molding case 104. After the above processes, a portion into which a sulfuric acid solution is injected or the contact surfaces between the molding case 104 and the external electrodes 103a and 103b are sealed with an epoxy resin or the like, thereby obtaining a product.

The internal resistance of the product completed as described above is in inverse proportion to the area of the separator 102. The separator 102 is processed to have dimples and an area about three times the area of a conventional separator. The internal resistance of 3 mΩ in the conventional separator is reduced to an internal resistance of 1 mΩ in the separator 102.

Note that, in the above embodiment, although uneven surfaces having a large number of dimples are formed in the separator 102 and the polarized electrodes 101a and 101b, uneven surfaces constituted by a large number of wave-like grooves may be formed in the separator 102 and the polarized electrodes 101a and 101b by the same processing method as described above.

An electric double layer capacitor according to the second embodiment of the present invention will be described below with reference to FIG. 2. According to the second embodiment, unlike the first embodiment described above, polarized electrodes 201a and 201b consisting of a mixture of an activated carbon powder and a sulfuric acid solution are alternately printed on a separator 202 at an isolated portion near the central portion of a unit constituted by opposing polarized electrodes 201a and 201b, and the separator 202 is alternately folded each time the polarized electrodes 201a and 201b are printed. More specifically, this stacked structure has a sectional structure obtained by causing the comb-like polarized electrode 201a to oppose the comb-like polarized electrode 201b such that the comb tooth portions of the polarized electrodes 201a and 201b are alternately interdigitated through the separator 202. The separator 202 is stacked to be alternately folded between the comb tooth portions of the polarized electrodes 201a and 201b. Reference numerals 203a and 203b denote external electrodes, respectively. In this case, the separator 202 and a molding case 204 consist of an acid resistant resin, and are completely shielded not to move the polarized electrode 201a to the polarized electrode 201b. According to the second embodiment, since the area of the separator 202 can be set to be larger than that of the first embodiment, the internal resistance can be considerably decreased. In fact, according to the second embodiment, since the area of the separator 202 can be increased to an area about ten times the area of the separator 2 shown in FIG. 3, the internal resistance of the electric double layer capacitor becomes about 0.3 mΩ. Therefore, the electric double layer capacitor is allowed to flow a current of 200 A to 300 A required for driving an electric vehicle.

As has been described above, according to the present invention, since the area of a separator can be considerably increased, an electric double layer capacitor capable of decreasing an internal resistance and supplying a large current can be obtained.

What is claimed is:

1. An electric double layer capacitor comprising:

a pair of opposing polarized electrodes consisting of activated carbon;

a separator, having characteristics which allow said separator to transmit ions but not to transmit electrons, for isolating said polarized electrodes from each other, said separator having an uneven shape in the form of a large number of dimples for increasing a surface area of said separator;

a pair of external electrodes each having one terminal electrically connected to a corresponding one of said polarized electrodes; and an insulating molding case for externally extracting the other terminal of each of said external electrodes to accommodate said polarized electrodes together with an electrolytic solution.

2. A capacitor according to claim 1, wherein uneven surfaces are respectively formed in opposing surfaces of said polarized electrodes to conform to the uneven shape of said separator, and said separator is arranged between the opposing surfaces of said polarized electrodes such that the uneven surfaces are fitted on the uneven portion of said separator, thereby isolating said polarized electrodes from each other.

3. A capacitor according to claim 1, wherein said separator consisting of an insulating film having a large number of fine pores which transmit ions but do not transmit electrons.

4. An electric double layer capacitor comprising:

a pair of opposing polarized electrodes consisting of activated carbon;

a separator having a large number of fine pores which transmit ions but do not transmit electrons and consisting of an insulating film, said separator being processed to have dimples so as to increase a surface area of said separator;

a pair of external electrodes each having one terminal electrically connected to a corresponding one of said polarized electrodes; and an insulating molding case for externally extracting the other terminal of each of said external electrodes to accommodate said polarized electrodes together with an electrolytic solution, wherein dimple-like uneven surfaces are respectively formed in opposing surfaces of said polarized electrodes to conform to a dimple-like uneven portion of said separator, and said separator is arranged such that the dimple-like uneven portion is fitted on the opposing surfaces of said polarized electrodes, thereby isolating said polarized electrodes from each other.

* * * * *